G. W. CLARK.

Governors for Steam-Engines.

No. 5,258. Reissued Jan. 28, 1873.

Witness:
Jas. C. Hutchinson
C. L. Event.

Inventor.
George W. Clark
per Alexander Mason
Attorneys.

A.M. PHOTO-LITHOGRAPHIC CO. N.Y. (OSBORNE'S PROCESS.)

UNITED STATES PATENT OFFICE.

GEORGE W. CLARK, OF COUNCIL BLUFFS, IOWA.

IMPROVEMENT IN GOVERNORS FOR STEAM-ENGINES.

Specification forming part of Letters Patent No. 120,856, dated November 14, 1871; reissue No. 5,258, dated January 28, 1873.

*To all whom it may concern:*

Be it known that I, GEORGE W. CLARK, of Council Bluffs, in the county of Pottawattomie and State of Iowa, have invented certain new and useful Improvements in Steam-Governors; and do hereby declare the following to be a full, clear, and exact description thereof, reference being had to the accompanying drawing and to the letters of reference marked thereon.

The nature of my invention consists in a device for assisting in moving the governor-valve of a steam-engine, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
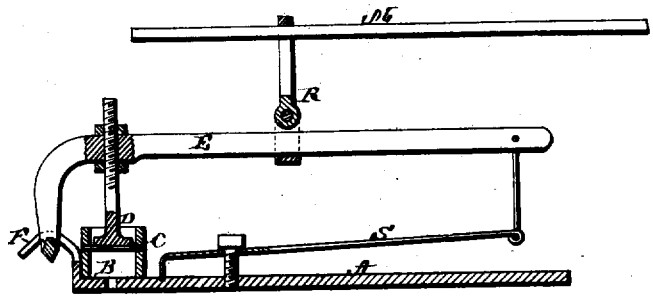
Figure 2:
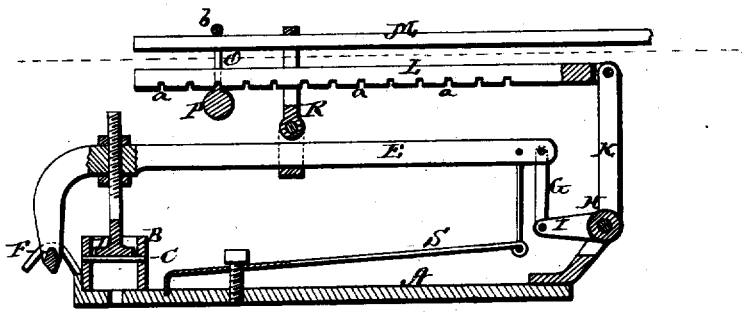
Figure 3:
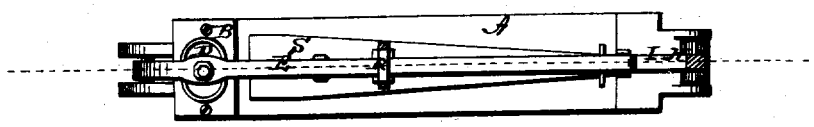

Figure 1 is a side elevation, part in section, of my invention; Fig. 2 is a similar view, showing an additional attachment thereto; and Fig. 3 is a horizontal section of the same.

A represents a base-plate for the apparatus, with a steam-chest, B, upon it, having a flexible cover, C, with a piston, D, above it to rise and fall as the pressure of steam increases or diminishes, the steam being admitted to said chest below the flexible cover. The rod of this piston is connected at the upper end with a lever, E, having its fulcrum at F. The lever E is arranged under the lever M of the ordinary ball-governor, and the two levers are connected by a link or stirrup, R, so that the latter cannot rise unless the former does. S is a spring connected to the lever E for pulling it down after being raised. When the pressure of steam increases, and it is necessary to have the throttle-valve closed, the piston D will rise and throw up the long arm of the lever E, thereby relieving the lever M, so that it may be raised by the balls for closing the throttle-valve, the object of the whole being to equalize the force of the steam on the engine. As the steam increases it will close the valve, and as it diminishes the spring will open the valve. The link R can be moved to the right or left, so that the governor-valve will move more or less, as found necessary, according to the speed it is desired for the engine to run.

In some cases the following additional device may be used, if desired: The end of the long arm of the lever E is connected by a link, G, with the short arm I of an elbow-lever, H, mounted on the base-plate A. The long arm K of this elbow-lever, which rises vertically above the pivot, is connected to one end of a long bar, L, arranged between the levers E and M, as shown in Fig. 2, and has notches *a a* in its lower edge. The bar L passes through a link, O, which suspends a weight, P, from the lever M and engages said weight by one of its notches, so that when moved forward or backward it will move the weight P along the lever M correspondingly. The link O is provided with a roller, *b*, for lessening the friction of moving along the lever M.

When the lever M is relieved, as above described, by the piston D rising, the elbow-lever H will at the same time, by the motion of the lever E, be turned on its pivot and move the bar L to the right, carrying the weight P along with it toward the pivot of the lever M, relieving the balls of the resistance of the weight against them, they being arranged to act on the short arm, which will, of course, be beyond the pivot of said lever M, thus affording the balls certain advantage in effecting the necessary movement of the throttle-valve; and when the pressure lessens under the piston D it will fall and cause the movement of the weight in the other direction beyond its mean position, and accelerate the action of the balls in moving the throttle in that direction. It will be understood that the mean position of the weight is that which it occupies when the engine is traveling at the required rate of speed. For different speeds the weight will be shifted toward or from the pivot of the lever M, and the bar L connected with it accordingly.

I do not limit myself to the particular arrangement of apparatus, which I have here shown, for operating the lever M or effecting the adjustment of the weight by the piston D, for many different contrivances of like character may be devised to produce the same results.

Having thus fully described my invention what I claim as new, and desire to secure by Letters Patent, is—

1. The combination of a governor-lever, M, a piston, D, and devices connecting the same, the piston being subject to the action of the live steam, and the said connecting devices arranged to operate the lever M as the steam-pressure varies and the piston rises or falls, substantially as and for the purposes herein set forth.

2. The combination of the steam-chest B, flexible cover C, piston D, lever E, spring S, link R, and lever M, all substantially as and for the purposes herein set forth.

3. The combination of a shifting re-enforcing weight P, a piston, D, and connecting devices therefor, with a governor-lever, M, the piston being subject to the action of the live steam, and the said connecting devices being arranged to cause the weight to shift along the said lever as the steam-pressure varies and the piston rises or falls, all substantially as specified.

4. The combination and arrangement of the piston D, lever E, elbow-lever H, notched bar L, weight P, governor-lever M, and springs S, all substantially as specified.

In testimony that I claim the foregoing I have hereunto set my hand this 11th day of November, 1872.

GEORGE W. CLARK.

Witnesses:

E. A. AYERSS,

J. H. COX.